United States Patent
Imai et al.

(10) Patent No.: US 9,116,351 B2
(45) Date of Patent: Aug. 25, 2015

(54) OPTICAL SCANNING DEVICE AND IMAGE FORMING APPARATUS

(75) Inventors: Shigeaki Imai, Kanagawa (JP); Yukio Itami, Kanagawa (JP); Kensuke Masuda, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 402 days.

(21) Appl. No.: 13/224,838

(22) Filed: Sep. 2, 2011

(65) Prior Publication Data

US 2012/0056968 A1    Mar. 8, 2012

(30) Foreign Application Priority Data

Sep. 8, 2010 (JP) ................................. 2010-201077

(51) Int. Cl.
| | |
|---|---|
| G02B 26/08 | (2006.01) |
| G02B 5/09 | (2006.01) |
| B41J 2/44 | (2006.01) |
| G02B 26/12 | (2006.01) |
| B41J 2/47 | (2006.01) |

(52) U.S. Cl.
CPC .............. *G02B 26/124* (2013.01); *B41J 2/442* (2013.01); *B41J 2/473* (2013.01); *G02B 5/09* (2013.01); *G02B 26/123* (2013.01)

(58) Field of Classification Search
CPC ......... B41J 2/442; G02B 5/09; G02B 26/123; G02B 26/124
USPC ................... 347/138, 152, 245, 263
See application file for complete search history.

(56) References Cited

U.S. PATENT DOCUMENTS

| | | | |
|---|---|---|---|
| 5,069,515 A | | 12/1991 | Itami et al. |
| 5,555,122 A | * | 9/1996 | Takada .................... 359/196.1 |
| 5,726,699 A | | 3/1998 | Itami et al. |
| 5,739,602 A | | 4/1998 | Suzuki et al. |
| 5,883,732 A | * | 3/1999 | Takada et al. ............. 359/207.1 |

(Continued)

FOREIGN PATENT DOCUMENTS

| | | |
|---|---|---|
| JP | 3862950 | 10/2006 |
| JP | 2008-76566 A | 4/2008 |

(Continued)

OTHER PUBLICATIONS

Office Action issued Jan. 7, 2014, in Japanese Patent Application No. 2010-201077.

*Primary Examiner* — Justin Seo
*Assistant Examiner* — Kendrick Liu
(74) *Attorney, Agent, or Firm* — Oblon, McClelland, Maier & Neustadt, L.L.P.

(57) ABSTRACT

Provided is an optical scanning device including: a plurality of light sources; an optical deflector that includes reflection surfaces that deflect different light beams toward opposite sides of the optical deflector; and a light-shielding member provided in an area between incident light beams emitted from the plurality of light sources. The light-shielding member is positioned such that a portion of the light-shielding member is in a light-shield area surrounded by a circumscribed circle of the optical deflector, a line tangent to the circumscribed circle and orthogonal to a Y direction, and the incident light beam, the Y direction being a direction parallel to a main scanning direction and passing through a rotation center of the optical deflector, the main scanning direction being a direction, in which surfaces of image carriers are scanned.

16 Claims, 6 Drawing Sheets

(56) References Cited

U.S. PATENT DOCUMENTS

| | | |
|---|---|---|
| 6,580,186 B1 | 6/2003 | Suzuki et al. |
| 6,675,458 B1 * | 1/2004 | Davidson et al. ............ 29/564.4 |
| 6,778,203 B2 | 8/2004 | Itami et al. |
| 6,813,051 B2 | 11/2004 | Suzuki et al. |
| 6,822,775 B2 | 11/2004 | Suzuki et al. |
| 7,126,737 B2 | 10/2006 | Atsuumi et al. |
| 7,277,212 B2 | 10/2007 | Miyatake et al. |
| 7,355,770 B2 | 4/2008 | Miyatake et al. |
| 7,420,723 B2 | 9/2008 | Itami et al. |
| 7,564,607 B2 | 7/2009 | Imai |
| 7,586,660 B2 | 9/2009 | Itami |
| 7,602,540 B2 | 10/2009 | Masuda et al. |
| 7,619,796 B2 | 11/2009 | Imai |
| 7,643,046 B2 | 1/2010 | Imai et al. |
| 7,671,884 B2 | 3/2010 | Itami et al. |
| 7,679,801 B2 | 3/2010 | Itami |
| 7,728,863 B2 | 6/2010 | Miyatake et al. |
| 7,751,107 B2 | 7/2010 | Imai |
| 7,755,822 B2 | 7/2010 | Imai |
| 7,859,732 B2 | 12/2010 | Imai |
| 7,898,709 B2 | 3/2011 | Masuda et al. |
| 2005/0190420 A1 | 9/2005 | Imai et al. |
| 2006/0061847 A1 | 3/2006 | Itami |
| 2006/0158711 A1 | 7/2006 | Imai et al. |
| 2007/0053040 A1 * | 3/2007 | Sakaue et al. ................ 359/204 |
| 2007/0058255 A1 | 3/2007 | Imai et al. |
| 2007/0146852 A1 | 6/2007 | Itami |
| 2008/0019255 A1 | 1/2008 | Imai et al. |
| 2008/0068678 A1 | 3/2008 | Suzuki et al. |
| 2008/0192323 A1 | 8/2008 | Nakamura et al. |
| 2008/0212999 A1 | 9/2008 | Masuda et al. |
| 2009/0058979 A1 | 3/2009 | Saisho et al. |
| 2009/0074437 A1 | 3/2009 | Tanabe et al. |
| 2009/0225148 A1 | 9/2009 | Itami et al. |
| 2009/0225385 A1 | 9/2009 | Imai |
| 2010/0045766 A1 | 2/2010 | Imai et al. |
| 2010/0091083 A1 | 4/2010 | Itami et al. |
| 2010/0310284 A1 | 12/2010 | Funato et al. |
| 2011/0050836 A1 | 3/2011 | Masuda |
| 2011/0102536 A1 | 5/2011 | Imai |

FOREIGN PATENT DOCUMENTS

| | | |
|---|---|---|
| JP | 4154152 | 7/2008 |
| JP | 2011-186428 A | 9/2011 |
| JP | 2012-3137 A | 1/2012 |

* cited by examiner

EXAMPLE WHERE TIP PORTION TOWARD OPTICAL DEFLECTOR IS ACUTE ANGLED

FIG.7B

EXAMPLE WHERE TIP PORTION ILLUSTRATED IN FIG. 7A IS ROUNDED

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2010-201077 filed in Japan on Sep. 8, 2010.

BACKGROUND OF THE INVENTION

1. Field of the Invention

The present invention relates to an optical scanning device that forms an electrostatic latent image on an image carrier based on image information, and to an image forming apparatus, such as a copying machine, a printing machine, a facsimile machine, a plotter machine, and a multifunction peripheral (MFP) having a function of at least one of these machines, that include the optical scanning device.

2. Description of the Related Art

Providing, in what is called an in-opposed-directions-scanning scheme in which deflection is performed from a polygon mirror in opposed directions to perform scan in opposed directions by optical scanning systems that are opposed to each other over the polygon mirror, a light-shielding member to prevent such a situation that ghost light reflected from a surface of a lens of one of the optical scanning systems enters the other opposed optical scanning system and adversely affects an image is disclosed in Japanese Patent Application Laid-open No. 2003-202512 and Japanese Patent Application Laid-open No. 2002-196269.

In embodiments in Japanese Patent Application Laid-open No. 2003-202512 and Japanese Patent Application Laid-open No. 2002-196269, a scheme of providing the light-shielding member between incident light on the polygon mirror and scanning light and a scheme of providing the light-shielding member between two incident light beams of the opposed optical systems are described.

The scheme of providing the light-shielding member between incident light on the polygon mirror and scanning light requires that the light-shielding member be arranged in a way that will not cause vignetting of the incident light and the scanning light to occur. Accordingly, the light-shielding member is to be located away from the polygon mirror, disadvantageously allowing a portion of the ghost light to travel to the other opposed optical system. This can result in an adverse effect on an image.

The scheme of providing the light-shielding member between two incident light beams of the opposed optical systems is disadvantageous in that the ghost light is shielded incompletely, allowing a portion of the ghost light to travel to the other opposed optical system.

SUMMARY OF THE INVENTION

It is an object of the present invention to at least partially solve the problems in the conventional technology.

According to an aspect of the present invention, there is provided an optical scanning device including: a plurality of light sources; an optical deflector that deflects light beams emitted from the plurality of light sources to scan surfaces of image carriers and that includes reflection surfaces that deflect different light beams toward opposite sides of the optical deflector; and a light-shielding member provided in an area between incident light beams emitted from the plurality of light sources. The light-shielding member is positioned such that a portion of the light-shielding member is in a light-shield area surrounded by a circumscribed circle of the optical deflector, a line tangent to the circumscribed circle and orthogonal to a Y direction, and the incident light beam, the Y direction being a direction parallel to a main scanning direction and passing through a rotation center of the optical deflector, the main scanning direction being a direction, in which the surfaces of the image carriers are scanned.

According to another aspect of the present invention, there is provided an image forming apparatus that outputs a multi-color image, the image forming apparatus including: an optical scanning device that forms an electrostatic latent image on each of surfaces of a plurality of image carriers; developing devices that each develops the electrostatic latent image with toner of corresponding one of colors to obtain toner image; and transfer units that each transfers the toner image of corresponding one of the colors developed on the surface of the image carrier onto a recording medium in a manner that the toner images of the respective colors are overlapped on one another. The optical scanning device comprising: a plurality of light sources; an optical deflector that deflects light beams emitted from the plurality of light sources to scan the surfaces of the image carriers and that includes reflection surfaces that deflect different light beams toward opposite sides of the optical deflector; and a light-shielding member provided in an area between incident light beams emitted from the plurality of light sources. The light-shielding member is positioned such that a portion of the light-shielding member is in a light-shield area surrounded by a circumscribed circle of the optical deflector, a line tangent to the circumscribed circle and orthogonal to a Y direction, and the incident light beam, the Y direction being a direction parallel to a main scanning direction and passing through a rotation center of the optical deflector, the main scanning direction being a direction, in which the surfaces of the image carriers are scanned.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention will be described below with reference to the accompanying drawings.

Figure 1:
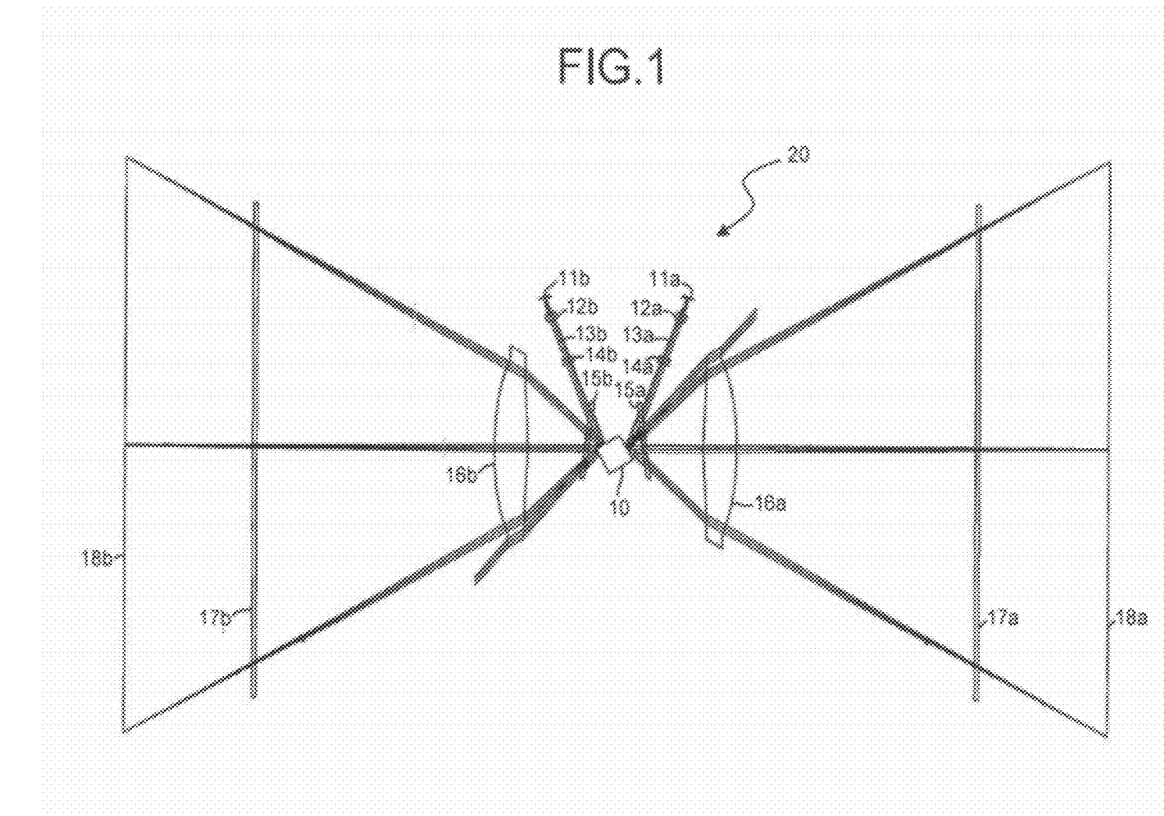
FIG. 1 is a schematic plan view of an optical scanning device according to an embodiment of the present invention.

First, an optical scanning device will be described below with reference to FIG. 1. FIG. 1 illustrates an optical scanning device, which is configured to be applied to a full-color image forming apparatus, according to an embodiment of the present invention. In the present embodiment, scanning for two stations is performed in each of opposite directions that are opposed to each other over a polygon mirror 10 serving as an optical deflector. In FIG. 1, optical elements (light sources, lenses, and the like) of the two stations are arranged to overlap each other in a direction vertical to the drawing plane (in a sub-scanning direction) on each other.

Each of light sources 11 is a light source, such as a semiconductor laser. A light beam emitted from the semiconductor laser is collimated into a substantially parallel light beam by a coupling lens 12. The light beam is then shaped through an aperture 13 into a light beam of a desired beam width. Thereafter, the light beam is converged in the sub-scanning direction by a cylindrical lens 14 to become linear along a main-scanning direction on a deflection surface of the polygon mirror 10.

Soundproof glasses 15 are provided to prevent scanning lenses 16 from being directly exposed to high-temperature airflow produced by the polygon mirror 10. In the present embodiment, the polygon mirror 10 has an inscribed circle diameter of 7 mm, is a four-sided mirror and in which two mirror surfaces are arranged in the sub-scanning direction (a direction along a rotation axis).

The light beams deflected for scanning by the polygon mirror 10 are focused on surfaces 18 of image carriers, such as photosensitive elements, by the scanning lenses 16. In the embodiment illustrated in FIG. 1, illustration of a folding mirror is omitted; however, in practice, the folding mirror is appropriately positioned to fold an optical path to guide the light to the surface of the image carrier.

Optical elements from the light sources 11 to dust-proof glasses 17 for the four stations are housed in a single housing.

Figure 2:
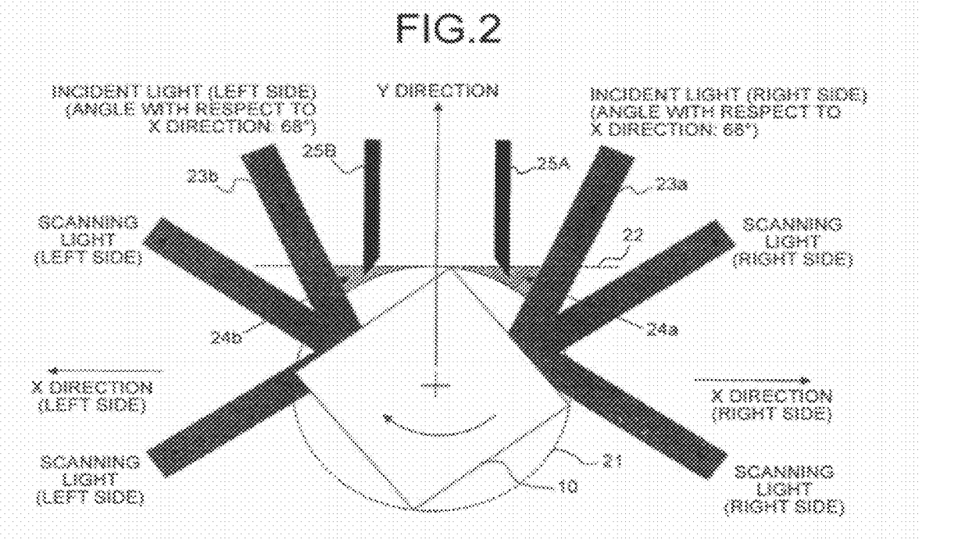
FIG. 2 is an enlarged view illustrating a positional relationship in a vicinity of an optical deflector between a light-shield area, which is located closer to a light source than the optical deflector, and a light-shielding member.

FIG. 2 illustrates an example of a light-shielding member. FIG. 2 is an enlarged view of and near the polygon mirror illustrated in FIG. 1. A direction parallel to the main scanning direction, in which the surfaces of the image carriers such as the photosensitive elements are scanned, and passing through a rotation center of the optical deflector 10 is defined as a Y direction. Areas surrounded by a circumscribed circle 21 of the optical deflector 10, a line 22 tangent to the circumscribed circle 21 and orthogonal to the Y direction (a line in a side of the polygon mirror 10 toward which the light sources 11 is located among such lines), and incident light beams 23 are referred to as a light-shield area 24 that is indicated by hatching in FIG. 2.

The light-shield area 24 includes two areas, or, more specifically, an area 24a surrounded by an incident light beam 23a on the right side and an area 24b surrounded by an incident light beam 23b on the left side.

A light-shielding member 25 is preferably provided in at least any one of the two light-shield areas.

Providing the light-shielding member 25 in this way prevents a substantial amount of light reflected by the surface of one of the scanning lenses 16 from traveling to a side of the polygon mirror 10 toward which another of the scanning lenses 16 is located, thereby preventing production of an anomalous image.

The light-shielding member 25 is more preferably provided in each of the two light-shield areas 24A and 24B. Providing the light-shielding member 25 in this way allows, for any angle of light reflected by the surface of one of the scanning lenses 16, no optical path along which light can reach the side of the polygon mirror 10 toward which another of the scanning lenses 16 is located through the side of the optical deflector 10 toward which the optical sources 11 is located. Accordingly, production of an anomalous image can be reliably prevented.

Meanwhile, ghost light traveling from the side of the polygon mirror 10 toward which one of the scanning lenses 16 is located to the side of the polygon mirror 10 toward which another of the scanning lenses 16 is located through the side of the polygon mirror 10 toward which the light sources 11 is located can be shielded by a similar approach to that described above.

Figure 3:
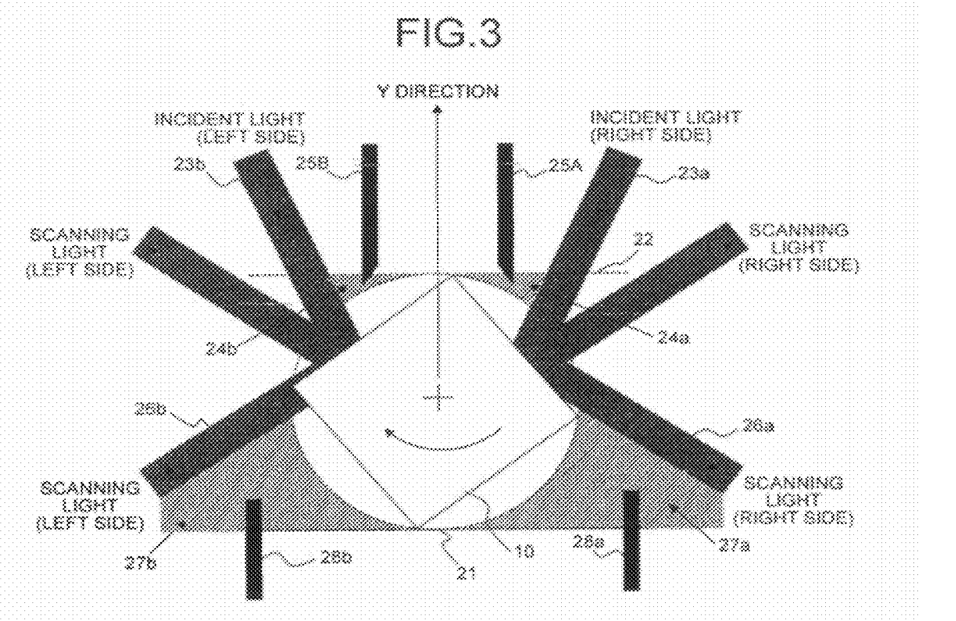
FIG. 3 is an enlarged view illustrating a positional relationship in a vicinity of the optical deflector between light-shield areas on a side of the optical deflector toward which the light source is located and a side of the optical deflector which is opposite to the light source, and light-shielding members.

More specifically, a light-shielding member 28 is preferably provided in a light-shield area 27 surrounded by the circumscribed circle 21 of the optical deflector, the line 22 tangent to the circumscribed circle 21 and orthogonal to the Y direction (a line in the area located further from the light sources 11 than the polygon mirror 10 among such lines), and outermost scanning light beams 26 as illustrated in FIG. 3.

As illustrated in FIG. 3, the light-shielding member 28 for ghost light traveling from the side of the polygon mirror 10 toward which one of the scanning lenses 16 is located to the side of the polygon mirror 10 toward which another of the scanning lenses 16 is located through the side of the polygon mirror 10 which is opposite to the light sources 11 can be provided easily because the light-shield area is larger. Accordingly, such ghost light can be shielded more easily than the ghost light traveling from the side of the polygon mirror 10 toward which one of the scanning lenses 16 is located to the side of the polygon mirror 10 toward which another of the scanning lenses 16 is located.

As illustrated in FIG. 2, in a case in which the light-shielding member is to be provided in each of the two light-shield areas 24, it is preferable to form light-shielding members 25A and 25B in one piece. This facilitates installation of the light-shielding member 25, thereby reducing cost related to the installation. Forming the light-shielding member 25 in one piece not only enhances strength of the light-shielding member during the installation of the light-shielding member but also reduces man-hours needed to position and fix the light-shielding member.

A direction orthogonal to both the Y direction and a direction of a rotation axis of the optical deflector is defined as an X direction. A direction toward which a light beam deflected by the optical deflector travels is defined as a positive direction.

The greater a size of the light-shield area 24 is, the more greatly installation of the light-shielding member 25 is facilitated. Therefore, an angle of incident light with respect to the X direction is preferably smaller than 90 degrees.

The smaller the angle of the incident light with respect to the X direction, the greater the size of the light-shield area. However, when the angle of the incident light with respect to the X direction is too small, an angle of scanning by the scanning light is too narrowed, causing a need to increase an optical distance and thus to upsize the optical scanning device.

Therefore, the angle of the incident light with respect to the X direction is preferably set to 55 to 75 degrees. In FIG. 2, the angle of the incident light with respect to the X direction is set to 68 degrees.

The light-shielding member 25 preferably has a plate-like shape that is thin in the X direction that is defined as the direction orthogonal to both the Y direction and the direction of the rotation axis of the optical deflector (FIG. 2 and the like). The smaller the thickness in the X-axis direction, the more effectively noise can be suppressed; however, when the thickness is too small, the light-shielding member 25 can be deformed due to lack of rigidity during continuous use and come into contact with the polygon mirror 10.

Therefore, the thickness of the light-shielding member 25 in the X direction is preferably in a range from 0.5 to 3 mm.

Figure 6:
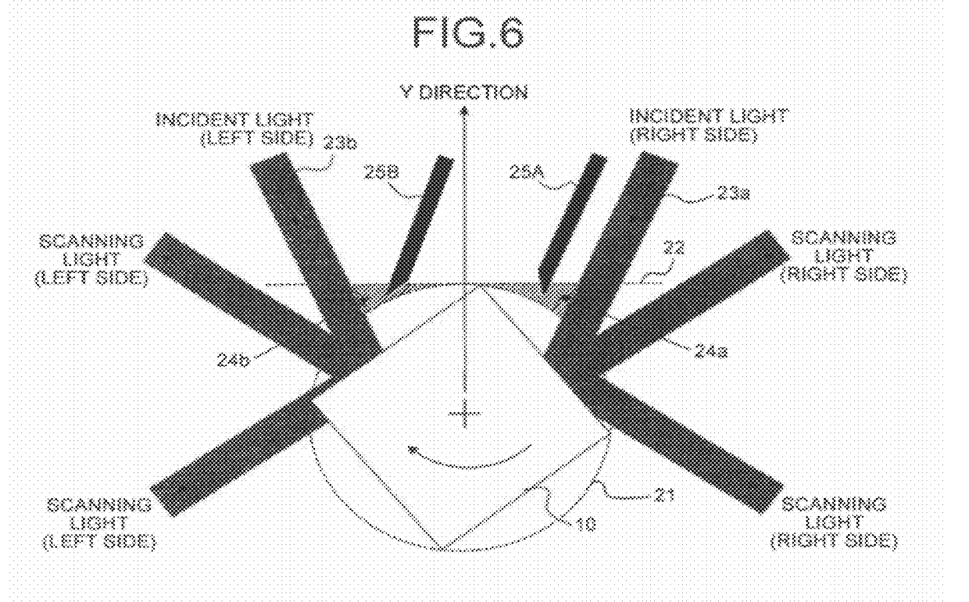
FIG. 6 is a diagram illustrating an exemplary arrangement where the light-shielding member is tilted in a rotating direction of the optical deflector.

A tip of the light-shielding member 25 toward the optical deflector is preferably acute-angled as illustrated in FIGS. 1, 2, and 6. When the tip is right-angled, a risk that the tip comes too close to the polygon mirror and contacts the polygon mirror is enhanced.

If the light-shielding member 25 is positioned away from the polygon mirror in the light-shield area 24 to avoid contact between the light-shielding member 25 and the polygon mirror, a risk that the light-shielding member 25 shields incident light is enhanced. To reduce such risks, the tip is preferably acute-angled. Forming the tip in an acute-angled shape prevents contact between the light-shielding member 25 and the polygon mirror and undesirable shielding of incident light. Forming the tip in the acute-angled shape also reduces an increase in noise.

Figure 7A:
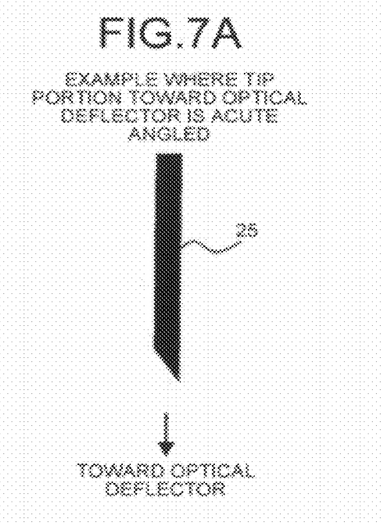
FIG. 7A and FIG. 7B are cross-sectional views illustrating shapes of a tip portion of the shielding member.
Figure 7B:
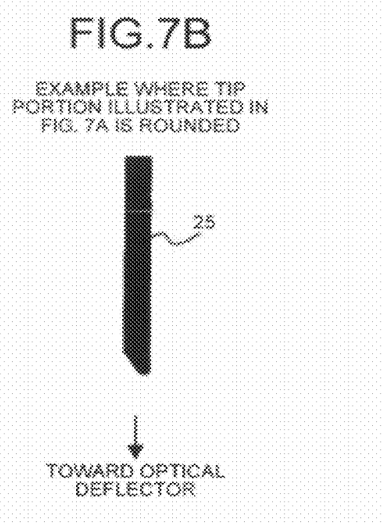

The acute-angled tip may be slightly rounded as illustrated in FIG. 7B to increase, in a case in which the light-shielding member is molded of resin, ease of molding the light-shielding member.

When the tip of the light-shielding member 25 toward the optical deflector is acute-angled, the light-shielding member 25 is preferably positioned such that only a portion of the acute-angled tip is in the light-shield area 24 as illustrated in FIGS. 1, 2, and 6.

When the light-shielding member 25 is positioned in this manner, tolerances for installation of the light-shielding member can be increased and hence ease of installation can be increased.

The light-shielding member 25 preferably has a shape tilted with respect to the Y direction in a rotating direction of the polygon mirror 10 as illustrated in FIG. 6. Forming the light-shielding member 25 in this way reduces, as compared with a case in which the light-shielding member 25 has a shape parallel to the Y direction (FIG. 1), resistance to airflow produced by rotation of the polygon mirror 10 and hence suppresses noise.

As illustrated in FIG. 2, the light-shield area 24 where ghost light traveling from the side of the polygon mirror 10 toward which one of the scanning lenses 16 is located to the side of the polygon mirror 10 toward which another of the scanning lenses 16 is located through the side of the polygon mirror 10 toward which the light sources 11 is located can be effectively shielded is very small. Therefore, it is necessary to position the light-shielding member 25 with high accuracy.

To position the light-shielding member 25 with high accuracy, it is necessary to increase accuracy of a portion of the light-shielding member, at which the light-shielding member is installed, and installation accuracy of the polygon mirror. The light-shielding member 25 can be positioned with high accuracy by this approach; however, a method described below is more preferably adopted.

A portion of the optical deflector, in particular, a member including the mirror surface, is required to have a high level of accuracy because of specification of the optical scanning device. Therefore, the member including the mirror surface of the optical deflector have a high level of accuracy. Accordingly, a method of positioning the optical deflector by bringing the member including the mirror surface of the optical deflector and the light-shielding member into contact with a spacing member that is separately provided, thereafter fixing the optical deflector, and then removing the spacing member is preferably adopted. This method allows positioning the light-shielding member with high accuracy and hence allows providing the light-shielding member closer to the polygon mirror, thereby enhancing ability to shield ghost light otherwise traveling from the side of the polygon mirror 10 toward which one of the scanning lenses 16 is located to the side of the polygon mirror 10 toward which another of the scanning lenses 16 is located.

This method also allows locating the light-shielding member at a position closer to the polygon mirror than in a conventional arrangement, thereby more reliably preventing production of ghost light traveling otherwise traveling from the side of the polygon mirror 10 toward which one of the scanning lenses 16 is located to the side of the polygon mirror 10 toward which another of the scanning lenses 16 is located.

In the member including the mirror surface of the optical deflector, a hole portion or a projecting portion provided coaxially with the rotation axis of the optical deflector has a highest level of accuracy. Accordingly, it is preferable to position the light-shielding member by bringing the spacing member into contact with the hole portion or the projecting portion provided coaxially with the rotation axis of the optical deflector.

The hole portion or the projecting portion provided coaxially with the rotation axis of the optical deflector can easily attain a high level of accuracy. Accordingly, installation accuracy of the light-shielding member can be increased, and contact between the light-shielding member and the polygon mirror can be prevented while more reliably preventing occurrence of ghost light traveling from the side of the polygon mirror 10 toward which one of the scanning lenses 16 is located to the side of the polygon mirror 10 toward which another of the scanning lenses 16 is located through the side of the polygon mirror 10 toward which the light sources 11 is located.

Figure 4:
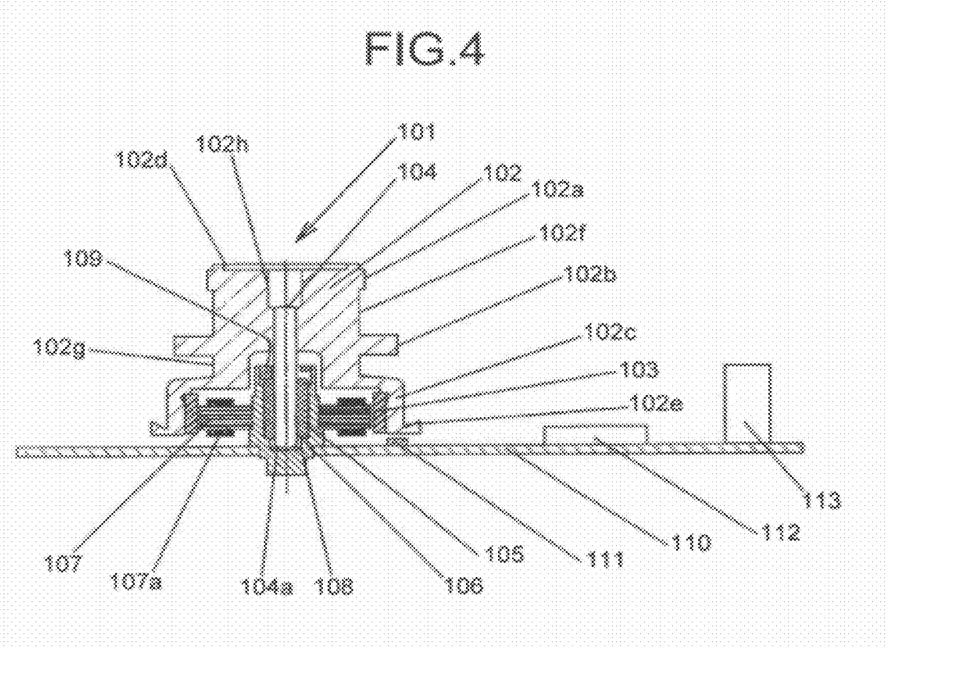
FIG. 4 is a schematic longitudinal cross-sectional view of the optical deflector.

FIG. 4 is a cross-sectional view of the optical deflector 10. The optical deflector, to which the light-shielding member is not installed yet, will be described in detail below.

In FIG. 4, a rotor 101 of the optical deflector 10 includes polygon mirrors 102a and 102b serving as the mirror surface and a flange 102c that supports a rotor magnet 103. The rotor 101 is shrink-fitted onto an outer periphery of a shaft 104. A bearing member 105 is an oilless dynamic bearing of which bearing clearance is set to be equal to or smaller than 10 μm in diameter. A mirror unit 102 is made by cutting aluminum.

To ensure stability during high speed rotations, a dynamic-pressure generating groove (not shown) is provided in a radial bearing. Although the dynamic pressure groove may be provided in any one of the outer peripheral surface of the shaft 104 and an inner peripheral surface of the bearing member 105, the dynamic pressure groove is suitably provided in the outer periphery of the shaft 104 because the shaft 104 is made of a sintered material having favorable machinability. As a material of the shaft 104, martensitic stainless steel (SUS420J2, for example) that can be hardened by quenching and that has favorable abrasive resistance can be suitably used. The rotor magnet 103 is fixed to an inner surface of a lower portion of the flange 102c. The rotor magnet 103 and a stator core 107 (winding coil 107a) fixed to a housing 106 constitute an outer-rotor type brushless motor. The rotor magnet 103 is a bonded magnet formed using resin as a binder. To prevent breakage caused by centrifugal force arising from high speed rotations, the rotor magnet 103 is held at its outer periphery by the flange 102c serving as a holding unit. A bearing in a thrust direction is a pivot bearing in which a convex surface 104a provided on a bottom end surface of the shaft 104 is brought into contact with a thrust bearing 108 facing the convex surface 104a. The thrust bearing 108 is formed of martensitic stainless steel, a metal member onto which surface hardening, such as diamond-like carbon (DLC) process, is applied, or a resin material to achieve favorable lubricity so as to suppress production of powder resulting from abrasion. The bearing member 105 and the thrust bearing 108 are housed in the housing 106 and sealed by a sealing member 109 that prevents oil leakage.

In a case in which the rotor 101 is to be rotated at a high speed equal to or higher than 25,000 rpm, it is required to adjust and maintain favorable balance of the rotor 101 with high accuracy to reduce vibrations of the rotor 101. The rotor 101 includes two imbalance correcting portions, one of which is at an upper portion and the other is at a lower portion of the rotor 101. Balance adjustment is performed by applying adhesive on each of the upper portion, or a top-surface circumferential recess 102d in the rotor 101, and the lower portion, or a circumferential recess 102e in the flange 102c. An imbalance should be controlled to an amount equal to or smaller than 10 mg-mm. For example, at a 10-mm radius position, a mass to be corrected is kept to be equal to or smaller than 1 mg. Meanwhile, for a case in which it is difficult to perform such fine adjustment as described above if using a substance to be attached, such as an adhesive, or a case in which the adhesive is peeled off and scattered during high-speed rotations of 40,000 rpm or higher because an amount of adhesive is small and hence adhesive force is weak, a method of removing (by drilling or laser beam machining) a portion of a component of the rotor is suitably performed.

The motor type of the present embodiment is what is called an outer-rotor type that has a magnetic gap in a radial direction and in which the rotor magnet 103 is located outside the stator core 107 in the radial direction. Rotating driving of the motor is performed by excitation switching of the winding coil 107a by a driver IC 112 with reference to signals, as position signals, output from a hall element 111 mounted on a circuit board 110 in response to a magnetic field produced by the rotor magnet 103. The rotor magnet 103 that is radially magnetized develops running torque relative to an outer periphery of the stator core 107 to rotate. Magnetic circuit of the rotor magnet 103 is open in an outer radial direction and vertical directions other than an inner radial direction. The hall element 111 used for excitation switching of the motor is positioned in an open magnetic circuit. A connector 113 is connected to a harness (not shown), over which power supply and stop and activation of the motor from a main body, input/output of control signals of a rotational speed, and the like are performed.

As illustrated in FIG. 4, the polygon mirrors 102a and 102b are connected with each other with a connecting portion 102f therebetween. Deflective reflection surfaces are fixed at angles different between the polygon mirrors 102a and 102b by approximately 45 degrees in the rotating direction with respect to each other. A connecting portion 102g is provided between the lower polygon mirror 102b and the flange to integrate a motor unit in one piece. Thus, the polygon mirror is downsized in order to reduce materials of the rotor to thereby reduce impact on environment, as well as to reduce an effect of windage losses resulting from rotations of the polygon mirror to thereby reduce noise and rotation energy. As a result, there is obtained a compact rotor in which the polygon mirror is smaller than the motor unit.

The optical deflector is generally used in a range from approximately 20 krpm to a high rotational speed exceeding 60 krpm. It is necessary to reduce bearing loss to rotate the optical deflector at such a high rotational speed exceeding 60 krpm. Accordingly, a small dynamic bearing of which shaft is approximately 2 to 3 mm in diameter is used.

The polygon mirrors 102a and 102b, which is a shaft integrated type in which the shaft 104 serving as the bearing member is shrink-fitted, have the reflection surfaces that are formed by superfine machining using aluminum alloy as a base material. A transparent protective coating is applied onto each of the reflection surfaces.

In FIG. 4, although the deflective reflection surfaces are fixed at angles different between polygon mirrors 102a and 102b by approximately 45 degrees in the rotating direction, the deflective reflection surfaces may be fixed without difference in an angle between polygon mirrors 102a and 102b in the rotating direction.

FIGS. 5A to 5D are diagrams illustrating a procedure of positioning the light-shielding member.

Step 1: A small-diameter portion 201 of an installation adjustment jig 200 serving as the spacing member is inserted into a cylinder hole 102h serving as a first coaxial adjustment portion in the rotor.

Step 2: A cylinder hole 25a of the light-shielding member 25 is slid along a large-diameter portion 202 of the installation adjustment jig 200 using the large-diameter portion 202 as a guide to fix the light-shielding member 25 onto the circuit board 110. At this time, the light-shielding member 25 is installed by fitting a detent 25b formed on the light-shielding member 25, to restrict rotation of the rotor about a rotation center axis, into a positioning hole 110a defined in the circuit board 110.

Step 3: Fixation of the light-shielding member 25 onto the circuit board 110 is performed by adhering respective contact portions of the light-shielding member 25 and the circuit board 110 to each other with an adhesive, a double-sided adhesive tape, or the like. Alternatively, the fixation can be performed by defining a hole in the circuit board 110 to fasten the light-shielding member with a screw inserted from a backside of the circuit board 110.

Step 4: The installation adjustment jig 200 is taken off upward from the light-shielding member 25.

The cylinder hole 102h in the rotor is substantially coaxial with a hole, in which the rotation axis is shrink fitted. Therefore, light-shielding portions can be arranged on a cylindrical surface that is substantially coaxial with the rotation center axis.

A second coaxial adjustment portion includes a cylindrical portion whose diameter is larger than that of the first coaxial adjustment portion; accordingly, the installation adjustment jig 200 can be taken off upward.

Although only relevant portions of the installation adjustment jig 200 are illustrated, for example, a grip portion may be provided on a top portion of the installation adjustment jig 200 to facilitate operations during installation.

Installation can be achieved even when an order of Step 1 and Step 2 in the installation procedure described above is reversed. When the reversed order is adopted, installation can be performed as follows. The light-shielding member is mounted on the installation adjustment jig 200 in advance; thereafter, the installation adjustment jig 200 is fit in the cylinder hole 102h in the rotor; the light-shielding member 25 is slid to moved and fixed onto the circuit board 110.

The light-shielding member may be provided on an optical housing where the scanning lenses, a polygon substrate, and the like are housed; however, in view of ease of installation or replacement of the polygon, the light-shielding member is preferably fixed onto a substrate that supports the polygon mirror.

The smaller the mirror surfaces of the optical deflector, the smaller power consumption, contributing to reduced impact on environment. A four-sided polygon mirror including four reflection surfaces is advantageous for reduction of the optical distance because such a polygon mirror allows a wide scanning angle even when the polygon mirror has a small inscribed circle radius of approximately 7 to 8 mm. Thus, such a polygon mirror contributes to compact design of the optical scanning device.

However, the four-sided polygon mirror is small in size and hence disadvantageous in that light reflected by the scanning lens and traveling from the side of the polygon mirror 10 toward which one of the scanning lenses 16 is located to the side of the polygon mirror 10 toward which another of the scanning lenses 16 is located is not likely to be shielded by the polygon mirror. This increases an amount of light traveling from the side of the polygon mirror 10 toward which one of the scanning lenses 16 is located to the side of the polygon mirror 10 toward which another of the scanning lenses 16 is located and enhances the possibility of adverse effect on an image. To avoid such a circumstance, the light-shielding member described above is preferably provided.

Figure 5A:
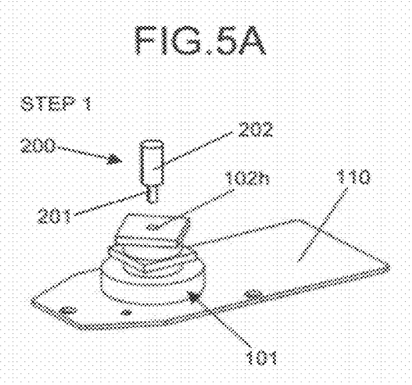
FIGS. 5A to 5D are diagrams illustrating a procedure of positioning the light-shielding member relative to the optical deflector.
Figure 5B:
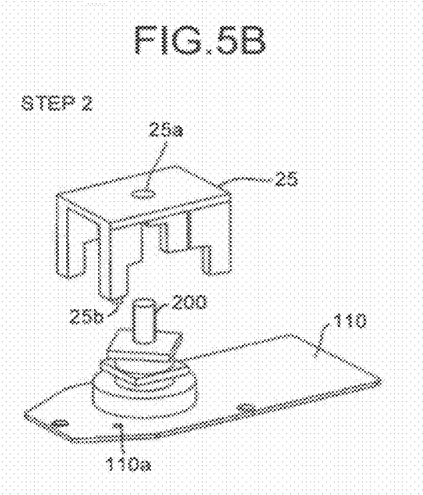
Figure 5C:
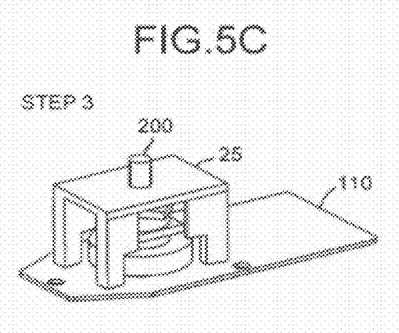
Figure 5D:
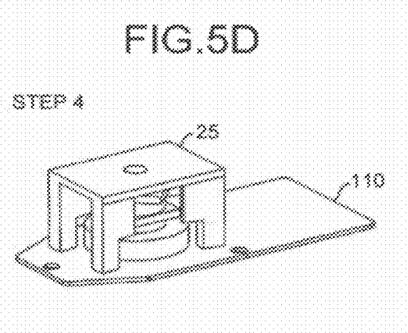

The polygon mirror may have a configuration in which the two mirror surfaces are arranged in the direction of a driving shaft (the rotation axis) of the optical deflector as illustrated in FIGS. 4 to 5D, or may have a configuration in which one mirror surface is arranged in that direction. When two mirror surfaces are arranged in that direction, as illustrated in FIGS. 4 to 5D, any one of an arrangement where the mirror surfaces arranged in that direction are at angles different from each other by 45 degrees in the rotating direction and an arrangement where the mirror surfaces arranged in that direction are at the same angle in the rotating direction can be employed.

Figure 8:
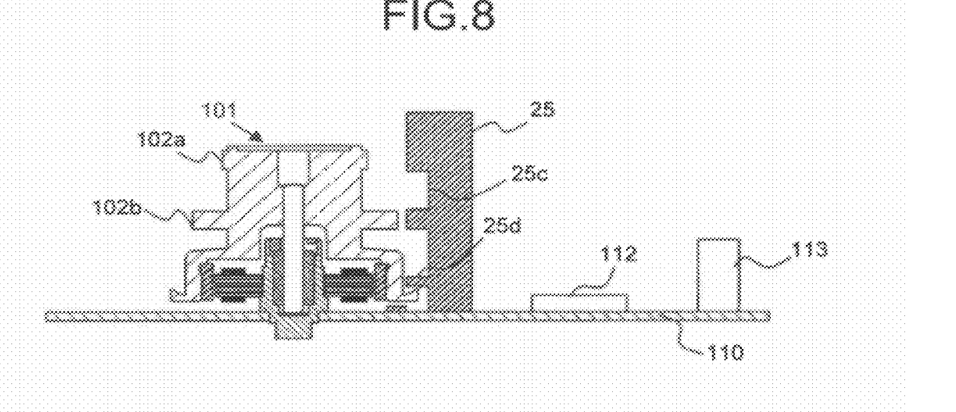
FIG. 8 is a diagram illustrating a cross-sectional profile of the light-shielding member adapted to the optical deflector.

When the mirror surfaces are arranged in that direction, as illustrated in FIG. 8, a notch 25c is preferably provided in an area that does not correspond to the mirror surfaces. Provision of the notch 25c can further suppress noise.

It is further preferable that the light-shielding member 25 includes a claw portion 25d that prevents come off of the mirror unit of the polygon mirror from the bearing as illustrated in FIG. 8. This prevents come off of the polygon mirror from the axis.

To reduce ghost light, which is light reflected from a scanning lens and traveling from the side of the polygon mirror 10 toward which one of the scanning lenses 16 is located to the side of the polygon mirror 10 toward which another of the scanning lenses 16 is located, it is preferable that the optical scanning system includes a single piece of the scanning lens 16 that has a biconvex surface geometry in the main-scanning direction. This causes light, which is reflected from an entrance surface of the scanning lens and traveling from the side of the polygon mirror 10 toward which one of the scanning lenses 16 is located to the side of the polygon mirror 10 toward which another of the scanning lenses 16 is located, to return to the polygon mirror at a relatively large angle from the X direction. Such light can be easily shielded, and hence an amount of light traveling from the side of the polygon mirror 10 toward which one of the scanning lenses 16 is located to the side of the polygon mirror 10 toward which another of the scanning lenses 16 is located can be reduced.

When the scanning lens 16 has the biconvex surface geometry in the main-scanning direction, as described above, light reflected from the entrance surface of the scanning lens returns to the polygon mirror at a relatively large angle from the X direction; accordingly, such light can be easily shielded. However, it is difficult to shield light reflected from an exit surface of the scanning lens because such light returns to the polygon mirror substantially parallel to the X direction. Accordingly, such light, which is difficult to shield, is likely to travel from the side of the polygon mirror 10 toward which one of the scanning lenses 16 is located to the side of the polygon mirror 10 toward which another of the scanning lenses 16 is located.

However, even when such light travels from the side of the polygon mirror 10 toward which one of the scanning lenses 16 is located to the side of the polygon mirror 10 toward which another of the scanning lenses 16 is located, if an amount of light reaching an image surface can be reduced, no serious problem arises with an image. To reduce the amount of light reaching the image surface, an exit surface of the scanning lens 16 in the sub-scanning direction is desirably a convex surface of which radius of curvature is as small as possible. The radius of curvature of the exit surface of the scanning lens in the sub-scanning direction can be made small by forming the scanning lens to have a concave entrance surface in the sub-scanning direction.

Figure 9:
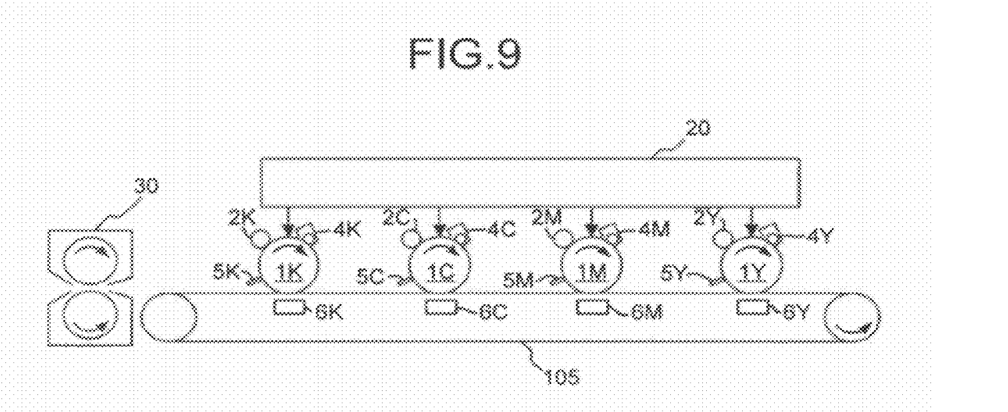
FIG. 9 is a schematic configuration diagram of an image forming apparatus.

FIG. 9 illustrates a basic configuration of a multicolor image forming apparatus corresponding to the image forming apparatus.

In FIG. 9, reference numeral 20 denotes the optical scanning device. Photosensitive elements 1Y, 1M, 1O, and 1K that serve as the image carriers rotate in directions indicated by arrows (clockwise). Charging members 2Y, 2M, 2C, and 2K, developing units 4Y, 4M, 4C, and 4K, transfer charging units 6Y, 6M, 6C, and 6K, and cleaning units 5Y, 5M, 5C, and 5K that are arranged in this order along a rotating direction of the photosensitive element.

The charging members 2Y, 2M, 2C, and 2K are members each of which belongs to a charging device that uniformly charges a surface of the corresponding photosensitive element. The optical scanning device 20 irradiates surfaces of the photosensitive elements between the charging members 2Y, 2M, 2C, and 2K and the developing units 4Y, 4M, 4C, and 4K with beams to form electrostatic latent images on the photosensitive elements.

The developing units perform development based on the electrostatic latent images, thereby forming toner images on the surfaces of the photosensitive elements. The transfer charging units 6Y, 6M, 6C, and 6K sequentially transfer the toner images of corresponding colors onto a recording sheet that is conveyed on a conveyor belt 105. Eventually, the images are fixed onto the recording sheet by a fixing unit 30.

Although the image forming apparatus has been described by way of the example of the multicolor image forming apparatus, the present invention is applicable to a color image forming apparatus of a tandem intermediate transfer type or a mono-color image forming apparatus.

According to an aspect of the present invention, in an in-opposed-directions-scanning scheme, a light-shielding member can be located at a position closer to an optical deflector than in a conventional arrangement. Accordingly, ghost light reflected from a lens surface of one of optical scanning systems can be reliably prevented from traveling to the side of the optical deflector toward which another of the optical scanning systems is located. Thus, an anomalous image can be reliably prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
a plurality of light sources;
an optical deflector that deflects light beams emitted from the plurality of light sources to scan surfaces of image carriers and that includes reflection surfaces that deflect different light beams toward opposite sides of the optical deflector; and
a light-shielding member provided in an area between incident light beams emitted from the plurality of light sources, wherein:
the light-shielding member is positioned such that a portion of the light-shielding member is in a light-shield area surrounded by a circumscribed circle of the optical deflector, a line tangent to the circumscribed circle and orthogonal to a Y direction, and the incident light beam, the Y direction being a direction parallel to a main scanning direction and passing through a rotation center of the optical deflector, the main scanning direction being a direction in which the surfaces of the image carriers are scanned,
the light-shielding member includes a plurality of light-shielding members each provided in a respective light-shield area that corresponds to different incident light beams,
positions of the plurality of light-shielding members overlap in a direction parallel to a rotation axis of the optical deflector,
of the plurality of light-shielding members is tilted with respect to the Y direction in a same direction that is a rotating direction of the optical deflector, and
each of the plurality of light-shielding members is respectively tilted from its end that is closest to the optical deflector.

2. The optical scanning device according to claim 1, wherein
an angle between incident light and a positive direction of X direction is smaller than 90 degrees, the X direction being a direction orthogonal to both the Y direction and a direction along the rotation axis of the optical deflector, the positive direction being a direction, toward which a light beam formed by deflecting the incident light by the optical deflector travels.

3. The optical scanning device according to claim 1, wherein the light-shielding member has a plate-like shape that is thin in an X direction, the X direction being a direction orthogonal to both the Y direction and a direction along the rotation axis of the optical deflector.

4. The optical scanning device according to claim 3, wherein the light-shielding member includes an acute-angled tip toward the optical deflector.

5. The optical scanning device according to claim 4, wherein the light-shielding member is positioned such that only a portion of the acute-angled tip is in the light-shield area.

6. The optical scanning device according to claim 1, wherein the plurality of light-shielding members are formed in one piece.

7. The optical scanning device according to claim 1, wherein
the light-shielding member is positioned by using a spacing member that comes into contact with a portion of the optical deflector and a portion of the light-shielding member and thereafter fixed, the spacing member being removed after fixation of the light-shielding member.

8. The optical scanning device according to claim 7, wherein the spacing member comes into contact with any one of a hole portion and a projecting portion provided coaxial with the rotation axis of the optical deflector.

9. The optical scanning device according to claim 7, wherein the light-shielding member is fixed onto a substrate that supports the optical deflector.

10. The optical scanning device according to claim 1, wherein the optical deflector includes four reflection surfaces.

11. The optical scanning device according to claim 1, wherein:
the reflection surfaces are arranged in a direction of the rotation axis of the optical deflector, and
a notch is provided in the light-shielding member in an area that does not correspond to the reflection surfaces.

12. The optical scanning device according to claim 1, wherein the light-shielding member includes a claw portion that prevents a mirror unit of the optical deflector from moving off of the rotation axis of the optical deflector.

13. The optical scanning device according to claim 1, further comprising:
optical scanning systems that each focuses respective light beams deflected by the optical deflector on a respective surface of a respective image carrier for scanning, wherein
each of the optical scanning systems includes a single scanning lens, the single scanning lens having a biconvex surface geometry in the main-scanning direction.

14. The optical scanning device according to claim 13, wherein the single scanning lens has, as a surface geometry in a sub-scanning direction, a concave entrance surface and a convex exit surface.

15. The optical scanning device according to claim 1, wherein each of the plurality of light-shielding members is tilted in a clockwise direction.

16. An image forming apparatus that outputs a multicolor image, the image forming apparatus comprising:
an optical scanning device that forms an electrostatic latent image on each of surfaces of a plurality of image carriers;
developing devices that each develops the electrostatic latent image with toner of a corresponding one of colors to obtain a toner image; and
transfer units that each transfers a respective toner image of a respective corresponding one of the colors developed on a respective surface of a respective image carrier onto a recording medium in a manner that the toner images of the respective colors are overlapped on one another, wherein the optical scanning device comprising:
a plurality of light sources;
an optical deflector that deflects light beams emitted from the plurality of light sources to scan the surfaces of the image carriers and that includes reflection surfaces that deflect different light beams toward opposite sides of the optical deflector; and
a light-shielding member provided in an area between incident light beams emitted from the plurality of light sources, wherein:
the light-shielding member is positioned such that a portion of the light-shielding member is in a light-shield area surrounded by a circumscribed circle of the optical deflector, a line tangent to the circumscribed circle and orthogonal to a Y direction, and the incident light beam, the Y direction being a direction parallel to a main scanning direction and passing through a rotation center of the optical deflector, the main scanning direction being a direction in which the surfaces of the image carriers are scanned, the light-shielding member includes a plurality of light-shielding members each provided in a respective light-shield area that corresponds to different incident light beams, positions of the plurality of light-shielding members overlap in a direction parallel to a rotation axis of the optical deflector, each of the plurality of light-shielding members is tilted with respect to the Y direction in a same direction that is a rotating direction of the optical deflector, and each of the plurality of light-shielding members is respectively tilted from its end that is closest to the optical deflector.

* * * * *